J. Vom Hofe,

Fishing Rod,

N° 35,339. Patented May 20, 1862.

Witnesses
Lemuel W. Serrell
Thos. Geo. Harold

Inventor
Julius vom Hofe

UNITED STATES PATENT OFFICE.

JULIUS VOM HOFE, OF NEW YORK, N. Y.

IMPROVEMENT IN TIPS FOR FISHING-RODS.

Specification forming part of Letters Patent No. 35,339, dated May 20, 1862.

*To all whom it may concern:*

Be it known that I, JULIUS VOM HOFE, of the city and State of New York, have invented, made, and applied to use a certain new and useful Improvement in Tips for Fishing-Rods; and I do hereby declare that the following is a full, clear, and exact description of the same, reference being had to the annexed drawings, making part of this specification, wherein—

Figure 1:
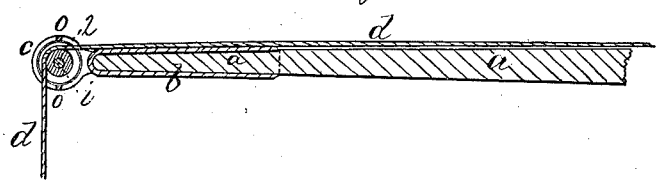
Figure 2:
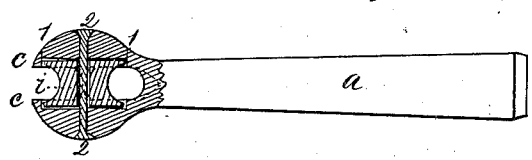

Figure 1 is a section longitudinally of my said tip as ready for use, and Fig. 2 is a partial longitudinal section at right angles to Fig. 1, and of about twice the ordinary dimensions of said tip.

Similar marks of reference denote the same parts.

The tips employed at the ends of fishing-rods are usually made as a flaring or bell-shaped end, with an opening for passing the line, and the parts are rounded so as to allow the line to draw through freely. In some instances pieces of agate and other stones are inserted to relieve the friction and prevent wear as the line is drawn through said tip. In the first-named case the friction is quite considerable, and both the line and tip are worn. In the latter case the cost is materially enhanced.

The nature of my said invention consists in the employment of a tip formed with projecting jaws, receiving between them a sheave, and provided with a guide or guides in such a manner that the cord or line cannot get off the sheave or be cut, injured, or entangled in use, thus avoiding all friction, and at the same time the appearance of the tip is but little changed.

In the drawings, $a$ is a portion of the end of the fishing-rod. $b$ is the socket of the tip, as usual. $c\ c$ are jaws, between which the sheave $i$ is fitted to take the fishing-line $d$. The jaws $c\ c$ are united, as at $o\ o$, in order to form a guide beneath which the fishing-line is threaded, and the jaws $c\ c$, projecting slightly beyond the sheave $i$, form a guide for the line; and these, in connection with the cross-guide $o$, insure a correct position to the line on the sheave $i$, regardless of the manner in which the line may have been thrown out.

In order to prevent the line as thrown out from catching in the tip, and to increase the beauty of finish, I form the jaws $c\ c$ with rounding or semi-globular exterior surfaces; and in order to have the edge of the sheave $i$ slightly recessed, so that the line cannot come in contact with the edges of the groove around said sheave, I introduce the same sidewise through an opening bored in one of the jaws $c\ c$, and then I insert the round plug, as at 1 1, Fig. 2, to fill said opening, and solder the same in place after the sheave has been introduced, and the necessary holes having been bored, the arbor 2 of said sheave is introduced and riveted up or otherwise fastened in place and the tip finished up.

The advantages of my improved tip will be apparent, for friction is avoided, the line cannot get entangled or out of place, and this tip becomes a cheaper and better article than the jeweled tips heretofore employed.

What I claim, and desire to secure by Letters Patent, is—

The fishing-rod tip formed with the guide $o$ and receiving the sheave $i$, in the manner and for the purposes substantially as specified.

In witness whereof I have hereunto set my signature this 17th day of February, 1862.

JULIUS VOM HOFE.

Witnesses:
LEMUEL W. SERRELL,
THOS. GEO. HAROLD.